(12) United States Patent
Nakamura et al.

(10) Patent No.: US 7,035,194 B2
(45) Date of Patent: *Apr. 25, 2006

(54) OPTICAL PICKUP APPARATUS FOR READING AND RECORDING INFORMATION ON RECORDING MEDIA

(75) Inventors: Mizuki Nakamura, Iwata-gun (JP); Atsushi Kitamura, Iwata-gun (JP); Kozo Matsumoto, Iwata-gun (JP); Motoji Egawa, Iwata-gun (JP)

(73) Assignee: Minebea Co., LTD, Kitasaku (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 425 days.

(21) Appl. No.: 10/243,921

(22) Filed: Sep. 16, 2002

(65) Prior Publication Data
US 2003/0053396 A1    Mar. 20, 2003

(30) Foreign Application Priority Data
Sep. 20, 2001    (JP) .............................. 2001-287343

(51) Int. Cl.
*G11B 7/135* (2006.01)
(52) U.S. Cl. ........................ 369/112.17; 369/112.19; 369/118
(58) Field of Classification Search .......... 369/112.17, 369/112.01, 112.22, 112.23, 53.2, 44.23, 369/94, 112.19, 118
See application file for complete search history.

(56) References Cited

U.S. PATENT DOCUMENTS

| 5,802,036 | A | * | 9/1998 | Ohba et al. ............ 369/112.17 |
| 6,026,072 | A | * | 2/2000 | Taira et al. .............. 369/275.3 |
| 6,321,028 | B1 | * | 11/2001 | Kajiyama et al. ........... 386/126 |
| 6,660,986 | B1 | * | 12/2003 | Matsumoto et al. ..... 250/201.5 |

FOREIGN PATENT DOCUMENTS

JP    A 2002-203334    7/2002

OTHER PUBLICATIONS

Suhara, Optical and Electro-Optical Engineering Contact, vol. 33, No. 11, 1995.

* cited by examiner

*Primary Examiner*—Hoa T. Nguyen
*Assistant Examiner*—Van T. Pham
(74) *Attorney, Agent, or Firm*—Oliff & Berridge, PLC

(57) ABSTRACT

An optical pickup apparatus for reading and recording information on recording media includes a semiconductor laser, a collimating lens, a half mirror, a reflecting mirror, and an objective lens. Further included therein are a super-resolution cutoff filter and an aperture control filter, one of which is appropriately selected and set right before the objective lens by a filter switching-over device. When reading the DVD, the super-resolution cutoff filter is set at the optical path, whereas when reading the CD, the aperture control filter is set thereat. The filter switching device is arranged separately from an actuator driving system having the objective lens integrally structured therewith.

2 Claims, 6 Drawing Sheets

OPTICAL PICKUP APPARATUS FOR READING AND RECORDING INFORMATION ON RECORDING MEDIA

BACKGROUND OF THE INVENTION

1. Field of the Invention

The present invention relates to an optical pickup apparatus for reading and recording information on recording media (hereinafter referred to as "optical pickup apparatus"), more particularly to an optical pick apparatus in which an actuator is made lightweight, whereby high-speed operation and cost reduction are realized.

2. Description of the Related Art

Currently, in an optical pickup apparatus using light, such as CD (compact disk) drive, information is read out in such a manner that a recording pit is produced by converging a laser beam emitted from a laser beam source, as a micro spot, onto a track provided on a disk-like recording medium such as a CD, presence or absence of the pit is recorded as information, the micro spot is radiated on the track, and that the presence or absence of the pit on the track is detected by a reflected laser beam.

Recently, DVDs (digital video disks) having a recording capacity about 7 times as large as that of CDs have been widely used to meet the demand of increased recording capacity. Increase in recording capacity means improvement of the recording density, which depends on the number of recording pits formed on a recording medium (hereinafter referred to as "disk"). In DVDs, one key way for increasing the recording density is decreasing the size of a recording pit, that is, decreasing the diameter of a laser beam spot on the disk. The size of the micro spot to be radiated on the disk is proportional to the wavelength of a laser beam and is inversely proportional to the numerical aperture of an objective lens. Accordingly, for decreasing the size of the recording pit, it is required to shorten the wavelength of the laser beam and/or to increase the numerical aperture of the objective lens.

However, DVDs are strongly required to be compatible with CDs for inheriting software resources. Originally, an optical pickup apparatus was provided with one laser beam source for a laser beam with a wavelength of 635 to 650 nm and one objective lens having a numerical aperture of about 0.6 for DVDs and also with another laser beam source for another laser beam with a wavelength of 780 nm and another objective lens having a numerical aperture of about 0.45 for CDs so as to ensure the compatibility between both disks.

However, when the numerical aperture of the objective lens is increased for DVDs, the convergence state of the laser beam deteriorates due to increased coma aberration with respect to the inclination of the optical disk. Since coma aberration is proportional to the thickness of the disk substrate as well as to the third power of the numerical aperture of the objective lens, the DVDs are designed to have a disk substrate thickness of 0.6 mm, which is half that of the CDs.

When the thickness of the disk substrate deviates from the prescribed value, spherical aberration occurs at a convergence position of light passing through the inward portion of the objective lens and a convergence position of light passing through the outward portion. Therefore, when a CD is read by using an objective lens with a numerical aperture of 0.6 optimized to the thickness of the DVD substrate, the spherical aberration must be corrected by limiting the outward portion of luminous flux incident on the lens or by slightly diverging the incident angle at the lens.

Thus, one objective lens adapted for the DVD may work compatibly for the CD with the necessary correction of spherical aberration, but two laser beam sources for laser beams having the above-mentioned respective different wavelengths have to be provided for a write-once-read-many CD because the reflective recording layer of the CD is formed of an organic dye material and has a reflection coefficient as low as 6% for a laser beam having a wavelength of 635 to 650 nm appropriate to the DVD.

The present inventors disclosed "Optical Pickup Apparatus for Reading and Recording Information on Recording Medium" in Japanese Patent Application No. 2000-401788. The optical pickup apparatus includes one semiconductor laser and a super-resolution cutoff filter disposed before an objective lens and reads and records information on two kinds of recording media each having a different recording density from other.

The super-resolution cutoff filter is an optical filter in coherent light using a technology called super-resolution. Since the super-resolution is a well-known technology and is described in detail in Optical and Electro-Optical Engineering Contact Vol. 33, No. 11 (1995) and the like, a description thereof will be omitted.

The resolving power of an optical device is related to the diameter of a laser beam spot converged by an objective lens. It is well known that a formula of $W=1.22\lambda/NA$ is valid, where W is the diameter of the main lobe of a convergent spot in paraxial approximation, $\lambda$ is the wavelength of a laser beam, and NA is the numerical aperture. Accordingly, the wavelength $\lambda$ has to be small and the numerical aperture NA has to be large in order to decrease the diameter W of the main lobe, that is, to obtain high resolution.

FIGS. 7A to 7D explain the relation between the configuration of the super-resolution cutoff filter and the distribution of the diameter of the main lobe of a converged laser beam spot, in which FIGS. 7A and 7C show the configurations of the super-resolution cutoff filters, and FIGS. 7B and 7D show the distribution of the diameters of the main lobes obtained by respective configurations. The diameter W of the main lobe is called a diffraction-limited spot diameter, is normally the minimum spot diameter realizable, and shows the distribution as shown in FIG. 7B when a laser beam 50 is incident on an objective lens 16 shown in FIG. 7A. However, when a light-blocking plate 40 is placed right before the objective lens 16 whereby the distribution of the amplitude in the lens aperture surface is transformed so as to be small at the center and large at the outside periphery, the diameter of the main lobe of the converged spot can be smaller than the normal diffraction-limited value thereby obtaining the distribution shown in FIG. 7D.

FIG. 8 shows an optical pickup apparatus disclosed in the aforementioned Japanese Patent Application No. 2000-401788. The optical pickup apparatus includes a semiconductor laser 12 for a laser beam with a wavelength of 780 nm for a CD, a half mirror 11 which is a beam splitter element for reflecting and guiding the laser beam to a collimating lens 13 and also for transmitting and guiding a reflected laser beam from a disk 18 to a photo-detector 90 adapted for the wavelength of the semiconductor laser for a CD, and a reflecting mirror 15 for guiding the laser beam having passed through the collimating lens 13 to an objective lens 16 or 17 for making the laser beam converged and incident on the disk 18. The disk 18, either a DVD 18a or a CD 18b, is placed on a driving mechanism (not shown) and rotated thereby.

The objective lens 16 has a high numerical aperture (high NA) for a DVD. The objective lens 17 has a low numerical aperture (low NA) for a CD. The laser beam having passed through the collimating lens 13 is incident on the objective lens 16 or 17 selected according to the DVD 18a or the CD 18b. A super-resolution cutoff filter 10 is placed right before the objective lens 16. When reading the DVD 18a, the objective lens 16 combined with the super-resolution cutoff filter 10 as a unit is arranged at an optical path, whereas when reading the CD 18b, the objective lens 17 alone is arranged at the optical path. The objective lens 16 combined with the super-resolution cutoff filter 10, and the objective lens 17 are integrated with a device for switching over the lenses and an actuator driving system for controlling their position relative to a recording surface of the disk, and are interchanged for the DVD and the CD by a driving mechanism (not shown).

The laser beam reflected from the disk 18 starts traveling in the backward direction along the incoming path, passes through the half mirror 11, is directed to the photo-detector 90, and converted thereby into an electrical signal.

The super-resolution cutoff filter 10 comprises a transparent plate glass 33 and two anti-reflection films 31 each made of a multi-layer and formed on the both side surfaces of the transparent plate glass 33, respectively, such that one is formed entirely on one side surface and the other is formed partly on the other side surface, specifically, formed at portions except a central portion provided with a metal reflection film 32.

The optical pickup apparatus in FIG. 8 operates as follows. When reading and recording on the DVD 18a, a laser beam emitted from the semiconductor laser (a wavelength of 780 nm) 12 for a CD is reflected by the half mirror 11 so as to be directed to the collimating lens 13. The laser beam has its divergence angle collimated by the collimating lens 13 to get into a parallel pencil, has its optical path changed by the reflecting mirror 15, passes through the super-resolution cutoff filter 10, is converged by the objective lens 16 so as to have a predetermined spot diameter, and incident on a recording surface of the DVD 18a. In this instance, the objective lens 16 combined with the super-resolution cutoff filter 10 for the DVD is selected in advance and set in place by the driving mechanism (not shown) to be ready for operation.

The laser beam reflected at the recording surface of the DVD 18a starts traveling in the backward direction along the incoming path, passes through the objective lens 16 and the super-resolution cutoff filter 10, has its optical path changed by the reflecting mirror 15, is converged by the collimating lens 13, passes through the half mirror 11, is incident on the photo-detector 90, and converted thereby into an electrical signal. When a signal is recorded on the DVD 18a, the intensity of the laser bream is increased to a predetermined value, and when recorded information is read, the intensity of the laser bream is decreased to a predetermined value. This is controlled by a control circuit and a laser driving circuit (both circuits not shown).

When reading the CD 18b, only the objective lens 17 for the CD is selected in advance and set in place by the driving mechanism (not shown) to be ready for operation. Also, when information recorded on the CD is read, the intensity of the laser beam is controlled to be a predetermined value by the control circuit and the laser driving circuit (both circuits not shown).

However, the optical pickup apparatus shown in FIG. 8 has the following disadvantage. Though the super-resolution cutoff filter 10 placed right before the objective lens 16 enables the information to be compatibly read and recorded on two kinds of disks having respective different recording densities with only one semiconductor laser for a laser beam with a wavelength of 780 nm for a CD, two objective lenses, specifically, one having a high numerical aperture (high NA) for DVDs and another having a low numerical aperture (low NA) for CDs, are required to make the apparatus work compatibly for the both disks, and the two objective lenses are mounted on the same driving mechanism, and are selected and switched over thereby together with the super-resolution cutoff filter, prohibiting reduction in the weight. This prevents the optical pickup apparatus from operating at a high-speed and being produced inexpensively.

SUMMARY OF THE INVENTION

Accordingly, it is an object of the present invention to solve the above problem and provide an optical pickup apparatus with higher-speed operation and lower cost.

In order to solve the above problems, according to a first aspect of the present invention, the optical pickup apparatus comprises: a semiconductor laser for emitting a laser beam; a collimating lens for collimating the laser beam emitted from the semiconductor laser; super-resolution cutoff filter; an aperture control filter; an objective lens for converging the laser beam onto one recording medium of two kinds each having a different recording density from other; a photo-detector for detecting a reflected laser beam from the one recording medium of two kinds; and a filter switching-over means adapted to appropriately select one of the super-resolution cutoff filter and the aperture control filter according to the one recording medium in use and to switch over.

According to a second aspect of the present invention, in the apparatus of the first aspect, when information on a recording medium having a high recording density is read and recorded, the super-resolution cutoff filter is selected, and when information on a recording medium having a low recording density is read and recorded, the aperture control filter is selected.

According to a third aspect of the present invention, the apparatus comprises: a semiconductor laser for emitting a laser beam; a collimating lens for collimating the laser beam emitted from the semiconductor laser; a super-resolution cutoff filter; an aperture control filter; an objective lens for converging the laser beam onto one recording medium of two kinds each having a different recording density from other; a λ/4 phase plate provided between the super-resolution cutoff filter and the objective lens; a photo-detector for detecting a reflected laser beam from the one recording medium of two kinds; and a filter switching-over means adapted to appropriately select one of super-resolution cutoff filter with the λ/4 phase plate and the aperture control filter according to the one recording medium in use and to switch over.

According to a fourth aspect of the present invention, in the apparatus of the third aspect, when information on a recording medium having a high recording density is read and recorded, the super-resolution cutoff filter with the λ/4 phase plate is selected, and when information on a recording medium having a low recording density is read and recorded, the aperture control filter is selected.

BRIEF DESCRIPTION OF THE DRAWINGS

FIGS. 7A to 7D are explanatory drawings illustrating the relation between the configuration of a super-resolution cutoff filter as a super-resolution cutting-off means and the diameter of a main lobe of a converged spot, wherein FIGS. 7A and 7C show the configurations of super-resolution cutoff filters, and FIGS. 7B and 7D show the distribution of the main lobe diameters obtained by the super-resolution cutoff filters shown in FIGS. 7A and 7B, respectively.

DESCRIPTION OF THE PREFERRED EMBODIMENTS

Figure 1:
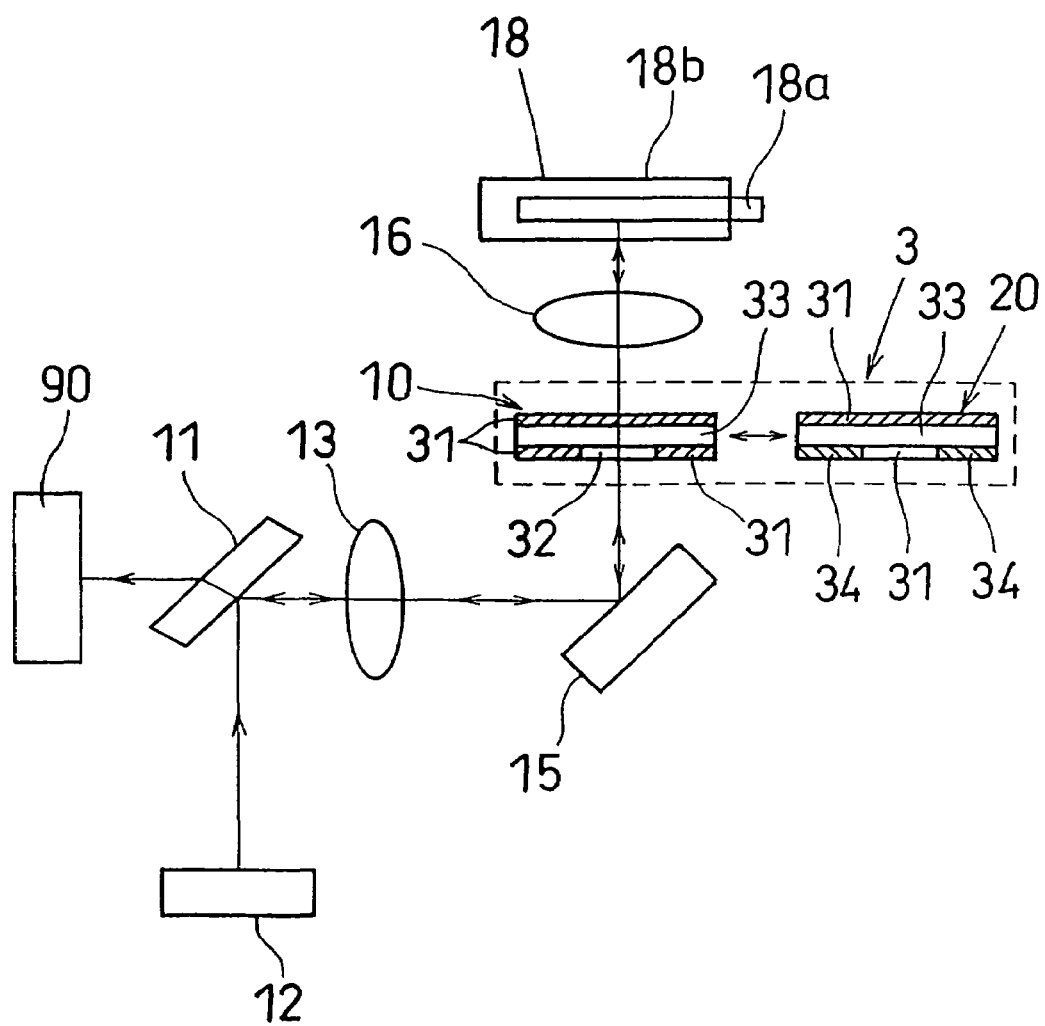
FIG. 1 is a block diagram showing an embodiment of the present invention.
Figure 8:
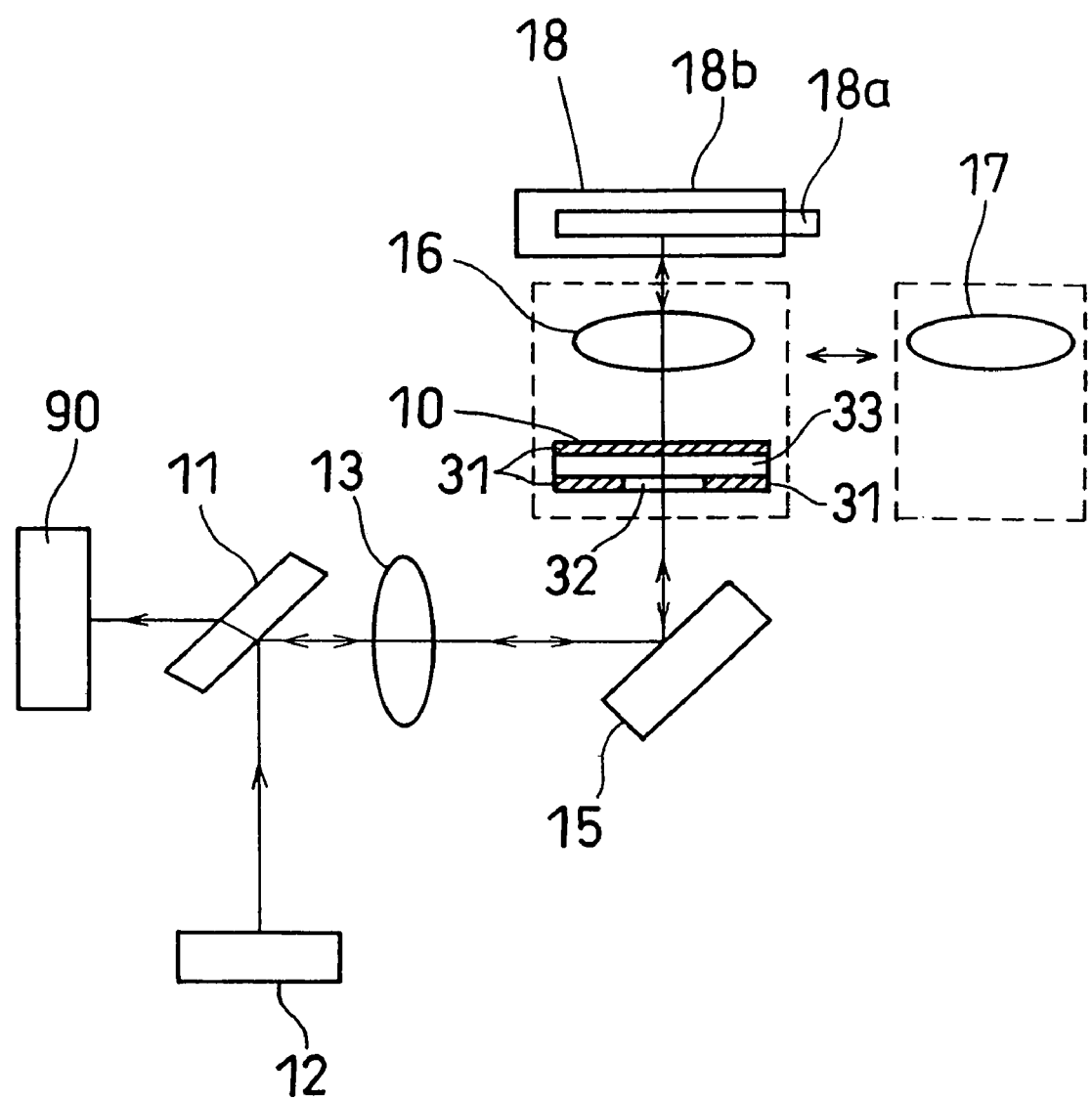
FIG. 8 is a block diagram of a conventional reading/recording apparatus.

The present invention will be described with reference to FIGS. 1 to 6. The same elements as those of FIG. 8 are denoted by the same reference numerals. Referring to FIG. 1, there are provided a semiconductor laser (for laser beam with a wavelength of 780 nm) 12 for CDs, and a half mirror 11 for reflecting and guiding a laser beam to a collimating lens 13 and also for passing and guiding a reflected laser beam from a disk 18 to a photo-detector 90 adapted for the wavelength of the semiconductor laser 12 for the CDs. Also provided is a reflecting mirror 15 for guiding the laser beam having passed through the collimating lens 13 to an objective lens 16 by which the laser beam is converged onto the disk 18. The disk 18, either a DVD 18a or a CD 18b, is placed on a driving mechanism (not shown) and rotated thereby.

The objective lens 16 has a high numerical aperture (high NA) for a DVD. The laser beam having passed through the collimating lens 13 is guided to the objective lens 16 through either a super-resolution cutoff filter 10 or an aperture control filter 20 placed right before the objective lens 16 depending on the kind of the disk 18. When reading the DVD 18a, the super-resolution cutoff filter 10 is placed at the optical path. When reading the CD 18b, the aperture control filter 20 is placed at the optical path.

The super-resolution cutoff filter 10 and the aperture control filter 20 are switched over by a filter switching device 3. The filter switching device 3 is arranged separately from an actuator driving system for controlling their position relative to a recording surface of the disk. The objective lens 16 is integrally structured with the actuator driving system.

The filter switching device 3 switches over the super-resolution cutoff filter 10 and the aperture control filter 20 rotatably by a rotating mechanism (not shown) for the DVD 18a and the CD 18b, respectively.

The laser beam reflected at the disk 18 starts traveling in the backward direction along the incoming path, passes through the objective lens 16, either the super-resolution cutoff filter 10 or the aperture control filter 20, the collimating lens 13 and the half mirror 11, is received by the photo-detector 90, and converted into an electrical signal.

The super-resolution cutoff filter 10 comprises a transparent plate glass 33, and two anti-reflection films 31 made of a multi-layer and formed on both side surfaces of the transparent plate glass 33, respectively, such that one is formed entirely on one side surface and the other is formed partly on the other side surface, specifically, formed at portions except a central portion provided with a metal reflection film 32, thereby producing super-resolution effect.

Figure 2:
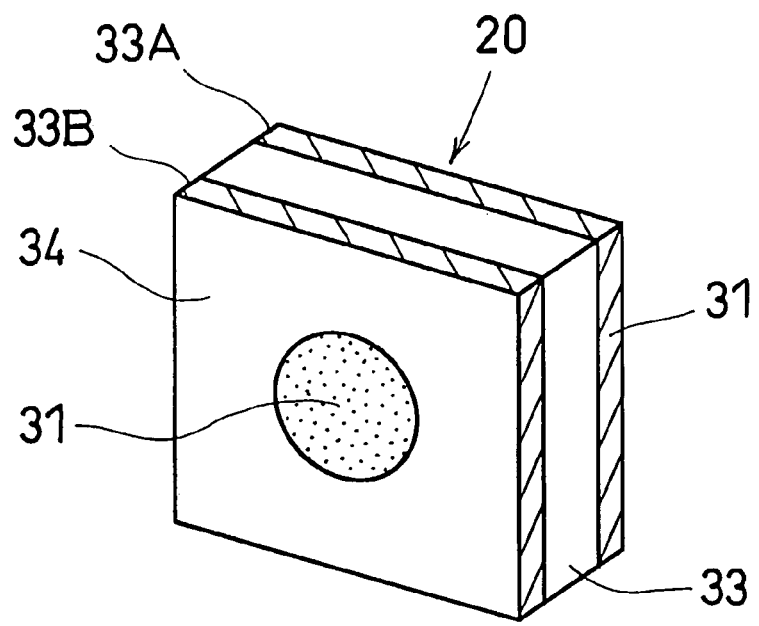
FIG. 2 is a perspective view showing an aperture control filter.

Referring to FIG. 2, the aperture control filter 20 comprises a transparent plate glass 33, and two anti-reflection films 31 made of a multi-layer and formed on both side surfaces 33A and 33B of the transparent plate glass 33, respectively, such that one is formed entirely on the side surface 33A and the other is formed partly on the other side surface 33B, specifically, formed at portions except a central portion provided with a wavelength selection film 34.

Figure 3:
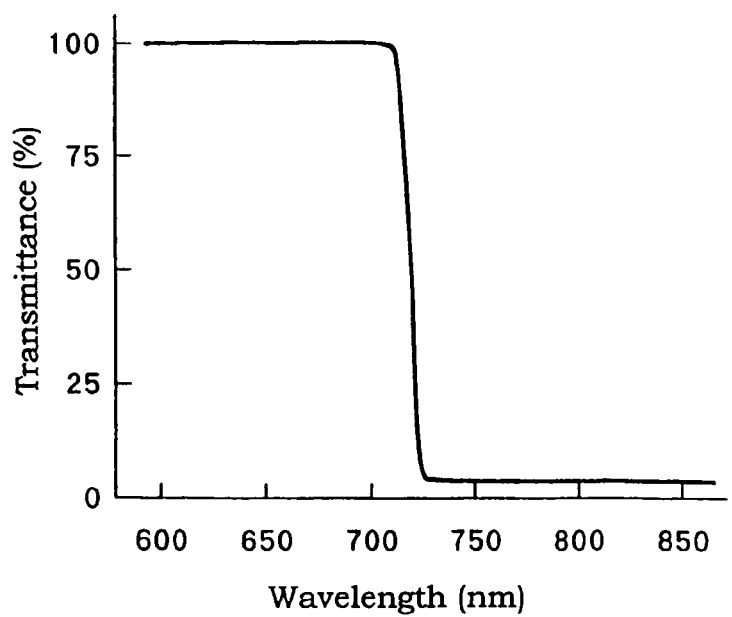
FIG. 3 is a graph showing the relationship between the wavelength and the transmittance of a wavelength selection filter used for the aperture control filter.

Referring to FIG. 3, the aperture control filter 20 has the transmittance decreased substantially to zero at the wavelength from 725 nm upward. Therefore, a laser beam having a wavelength of 780 nm for the CD is reflected. As described above, the aperture control filter 20 has an optical characteristic different between the central circular portion and the outside periphery, specifically, the outside periphery reflects a laser beam with a wavelength of 780 nm (for the CDs) while the central circular portion transmits both laser beams (for the CDs and the DVDs). When reading a CD, the laser beam with a wavelength of 780 nm passes through only the center of the aperture control filter 20 set in place for the CD to be incident on the objective lens 16, so that its effective NA is decreased, thereby converging the laser beam onto the CD 18b with a low aberration. In the present invention, a metal reflection film in place of the wavelength selection film 34 can produce a similar effect.

The optical pickup apparatus shown in FIG. 1 operates as follows. When reading and recording information on the DVD 18a, a laser beam emitted from the semiconductor laser (a wavelength of 780 nm) 12 for a CD is reflected by the half mirror 11, incident on the collimating lens 13, collimated thereby, has its optical path changed by the reflecting mirror 15, passes through the super-resolution cutoff filter 10 pre-selected by the filter switching device 3, is converged by the objective lens 16 into a beam spot with a predetermined diameter, and incident on a recording surface of the DVD 18a.

The laser beam reflected at the recording surface of the DVD 18a starts traveling in the backward direction along the incoming path to be incident on the half mirror 11, passes therethrough, is incident on the photo-detector 90, and converted thereby into an electrical signal. When the signal is recorded on the DVD 18a, the intensity of the laser bream is increased to a predetermined value, and when the recorded information is read back, the intensity of the laser bream is decreased to a predetermined value. This is controlled by a control circuit and a laser driving circuit (not shown).

When reading the CD 18b, the laser beam passes through the aperture control filter 20 pre-selected by the filter switching device 3, is converged by the objective lens 16 into a beam spot with a predetermined diameter, and incident on a recording surface of the CD 18b. Also, when information recorded on the CD 18b is read, the intensity of the laser bream is controlled to a predetermined value by the control circuit and the laser driving circuit (not shown).

Figure 4:
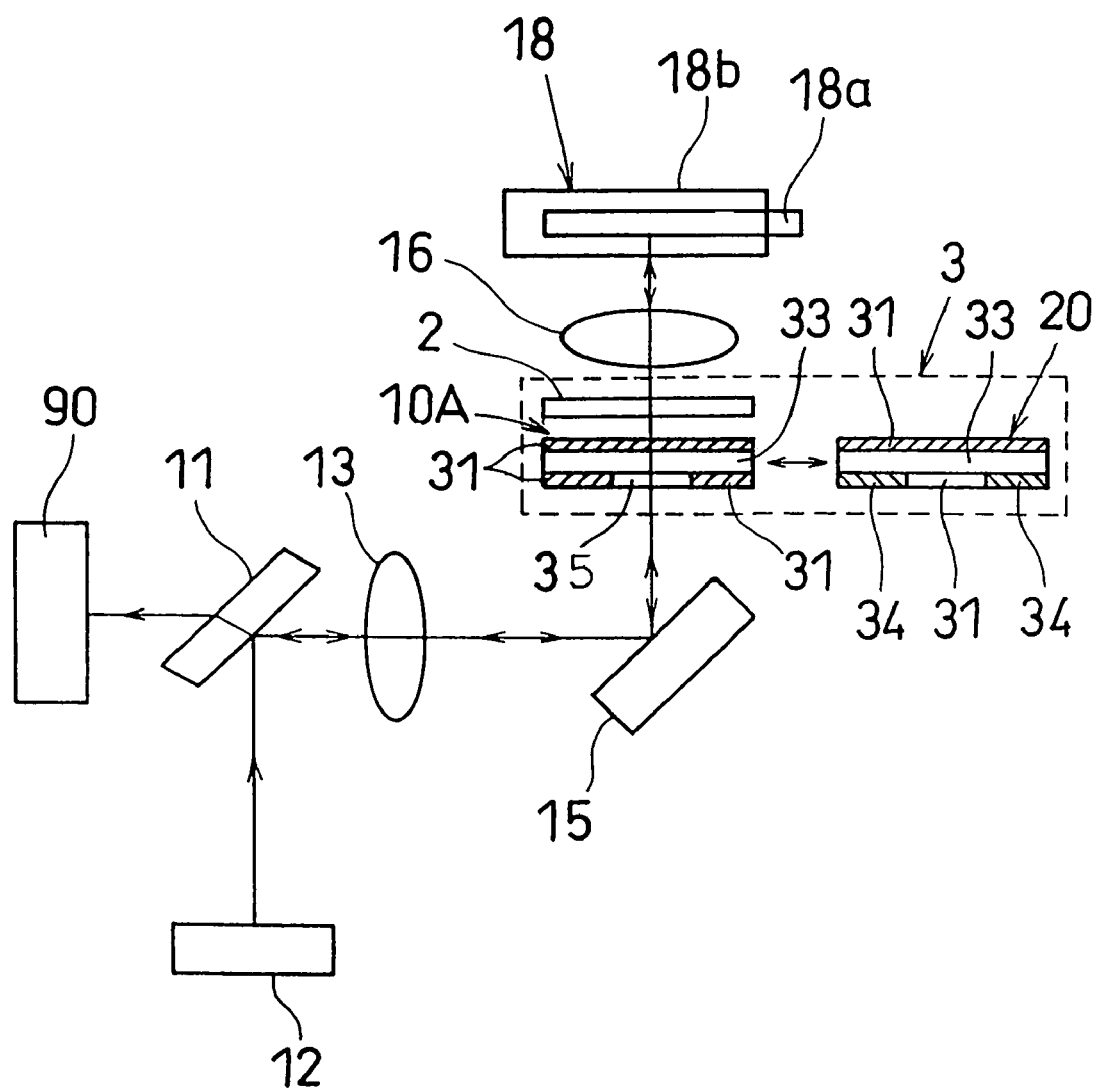
FIG. 4 is a block diagram showing another embodiment of the present invention.

Another embodiment of the present invention will be described with reference to FIG. 4. The difference from the embodiment shown in FIG. 1 is that a super-resolution cutoff filter 10A (to be shown in FIG. 5) replaces the super-resolution cutoff filter 10, and that a λ/4 phase plate 2 for rotating a polarization plane of a laser beam is placed between the super-resolution cutoff filter 10A and the objective lens 16.

Either the super-resolution cutoff filter 10A coupled with the λ/4 phase plate 2, or the aperture control filter 20 is selectively placed right before the objective lens 16. When reading the DVD 18a, the super-resolution cutoff filter 10A, together with the λ/4 phase plate 2, is placed at the optical path. When reading the CD 18b, the aperture control filter 20 alone is placed at the optical path.

The super-resolution cutoff filter 10A with the λ/4 phase plate 2, and the aperture control filter 20 are switched over by the filter switching device 3. The filter switching device 3 is provided separately from the actuator driving system for controlling their position relative to a recording surface of the disk. The actuator driving system has the objective lens 16 integrally formed therewith. The filter switching device 3 switches over the super-resolution cutoff filter 10A with the λ/4 phase plate 2, and the aperture control filter 20 rotatably by a rotating mechanism (not shown) for the DVD 18a or the CD 18b.

Figure 5:
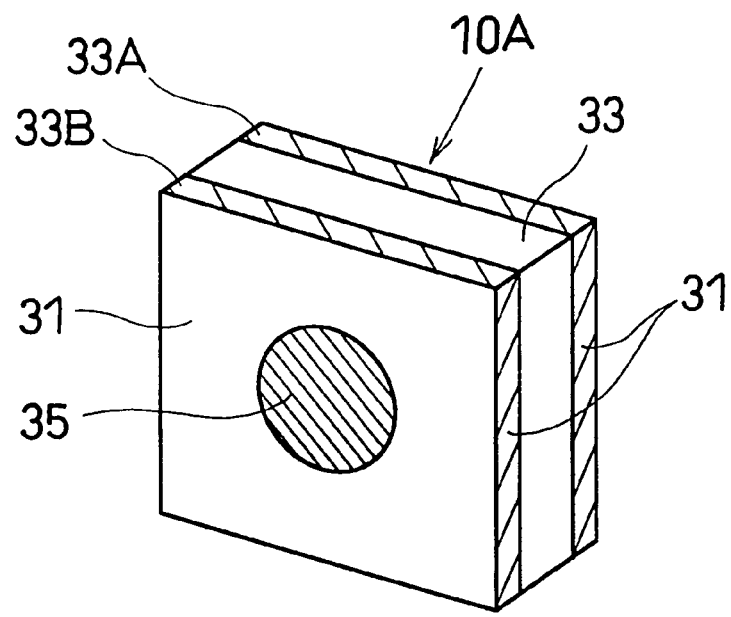
FIG. 5 is a perspective view showing a super-resolution cutoff filter on which a polarizing filter layer is formed.

Referring to FIG. 5, the super-resolution cutoff filter 10A comprises a transparent substrate 33 such as a parallel plate glass, and two anti-reflection films 31 made of a dielectric multi-layer film and formed on both side surfaces 33A and 33B of the substrate 33, respectively, such that one is formed entirely on one side surface 33A and the other is formed partly on the other side surface 33B, specifically, formed at portions except a central circular portion provided with a polarizing filter layer 35 of a dielectric multi-layer formed with $SiO^2$, $TiO_2$ and the like alternately evaporated. This gives an advantage in that the polarizing filter layer 35 and the anti-reflection film 31 can be produced by the same production equipment (film-forming device). The super-resolution cutoff filter 10A, composed of the polarizing filter layer 35, reduces the diameter of a laser beam spot converged by the objective lens 16 to be smaller than a normal diffraction-limited value. The polarizing filter layer 35 has a light transmitting characteristic shown in FIG. 6.

Figure 6:
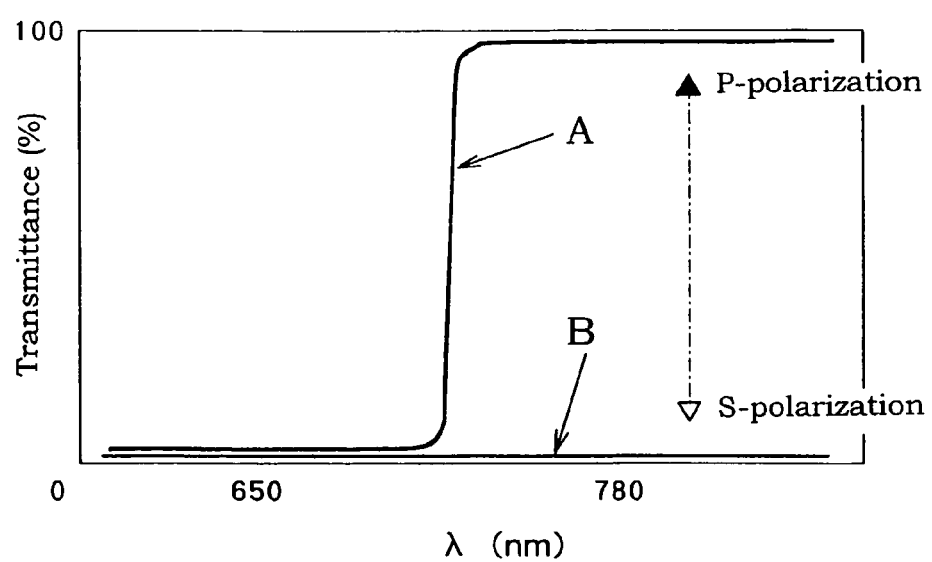
FIG. 6 is a graph showing the transmittance of the polarizing filter layer provided on the super-resolution cutoff filter.

Referring to FIG. 6, the abscissa shows the wavelength of a laser beam and the ordinate shows the transmittance of the light. As shown, at a wavelength band of 780 nm of the laser beam source 12, the polarizing filter layer 35 has substantially zero transmittance for an S-polarized laser beam (shown by the line B) and substantially 100% transmittance for a P-polarized laser beam (shown by the line A).

The optical pickup apparatus shown in FIG. 4 operates as follows. When reading and recording information on the DVD 18a, the super-resolution cutoff filter 10A with the λ/4 phase plate 2, rather than the aperture control filter, is pre-selected by the driving mechanism (not shown), and the polarization plane of a laser beam emitted from the semiconductor laser 12 is set to be S-polarization. These are controlled by a control device (not shown) according to the kind of the disk 18, either the DVD 18a or the CD 18b.

The S-polarized laser beam is reflected by the half mirror 11, collimated by the collimating lens 13, has its optical path changed by the reflecting mirror 15, and is incident on the super-resolution cutoff filter 10A. The incident laser beam is S-polarized as described above, therefore the polarizing filter layer 35 formed on the super-resolution cutoff filter 10A has substantially zero transmittance for the incident laser beam (see FIG. 6). Accordingly, the super-resolution cutoff filter 10A has super-resolution effect and works as a super-resolution cutoff filter for the incident laser beam.

Figure 7A:
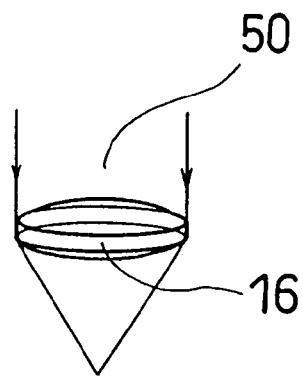
Figure 7B:
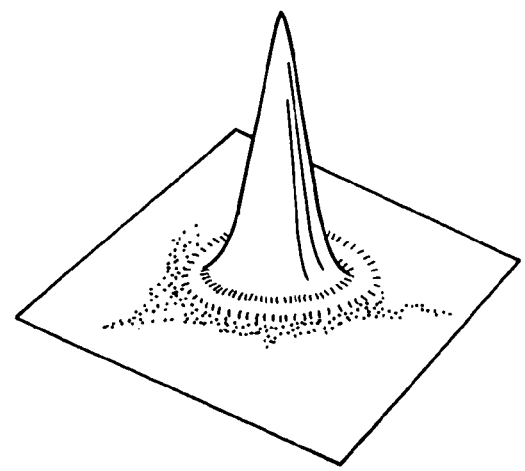
Figure 7:
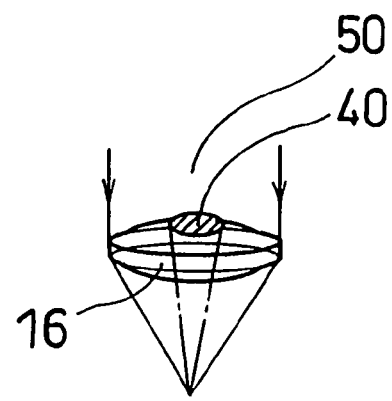
Figure 7:
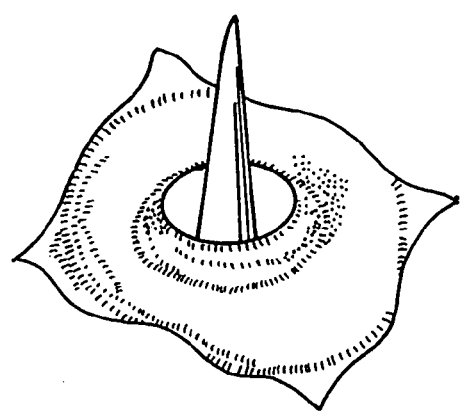

The diameter of a main lobe of a focus spot can be smaller than a normal diffraction-limited value thanks to the super-resolution cutoff filter 10A with the polarizing filter layer 35 and the laser beam S-polarized, thereby rendering the distribution shown in FIG. 7D. The laser beam having passed through the super-resolution cutoff filter 10A has its phase shifted by 90° (circularly-polarized light) while passing through the λ4 phase plate 2, is converged by the objective lens 16 into a beam spot with the above-described diameter, incident on the recording surface of the DVD 18a, and reflected thereat. The reflected laser beam passes again, now backward, through the λ/4 phase plate 2, and has its phase further shifted by 90° (linearly-polarized light). That is, the reflected laser beam here has its polarization plane rotated by 90° relative to the S-polarized laser beam incident on the super-resolution cutoff filter 10A, thereby constituting a P-polarized laser beam.

The P-polarized laser beam is incident on the super-resolution cutoff filter 10A with the polarizing filter layer 35, which has substantially 100% transmittance for the P-polarized laser beam obtained here (see FIG. 6), whereby the laser beam does not suffer loss while passing through the super-resolution cutoff filter 10A. This is an advantage in the second embodiment. The laser beam having passed through the super-resolution cutoff filter 10A has its optical path changed by the reflecting mirror 15, passes through the collimating lens 13 and the half mirror 11, is incident on the photo-detector 90, and converted into an electrical signal. When the signal is recorded on the DVD 18a, the intensity of the laser beam is increased to a predetermined value, and when the recorded information is read, the intensity of the laser beam is decreased to a predetermined value. This is controlled by a control circuit and a laser driving circuit (not shown).

When reading and recording information on the CD 18b, the aperture control filter 20, rather than the super-resolution cutoff filter 10A with the λ/4 phase plate 2, is pre-selected by a driving mechanism (not shown) for operation. Since the aperture control filter 20 is not polarization plane-dependent, a laser beam incident thereon may remain S-polarized. Those are controlled by a control device (not shown) according to the kind of the disk 18, the DVD 18a or the CD 18b. Otherwise, the operation applies which is described for reading and recording information on the CD 18b for the embodiment shown in FIG. 1, and a description thereof will be omitted.

According to the present invention, the weight of the driving mechanism in the optical pickup apparatus can be reduced thereby enabling a high-speed operation and a low cost production.

Furthermore, in addition to the reduction of the weight of the driving mechanism, the laser beam can be used effectively, thereby reducing electricity consumption.

What is claimed is:

1. An optical pickup apparatus for reading and recording information on recording media, the apparatus comprising:
   a semiconductor laser for emitting a laser beam;
   a collimating lens for collimating the laser beam emitted from the semiconductor laser;
   a super-resolution cutoff filter composed of a polarizing filter layer;
   an aperture control filter;
   an objective lens for converging the laser beam onto one recording medium of two kinds each having a different recording density from other;
   a λ/4 phase plate provided between the super-resolution cutoff filter and the objective lens;
   a photo-detector for detecting a reflected laser beam from the one recording medium of two kinds; and a filter switching-over means adapted to appropriately select one of the super-resolution cutoff filter combined with the λ/4 phase plate, and the aperture control filter according to the one recording medium in use and to switch over.

2. An optical pickup apparatus according to claim 1, wherein when information on a recording medium having a high recording density is read and recorded, the super-resolution cutoff filter combined with the λ/4 phase plate is selected, and when information on a recording medium having a low recording density is read and recorded, the aperture control filter is selected.

* * * * *